(12) United States Patent
Rengakuji

(10) Patent No.: US 6,266,446 B1
(45) Date of Patent: Jul. 24, 2001

(54) IMAGE CONVERSION BETWEEN RASTER AND BLOCK FORMATS FOR COMPRESSION AND DECOMPRESSION

(75) Inventor: Hideyuki Rengakuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/092,082

(22) Filed: Jun. 5, 1998

(30) Foreign Application Priority Data

Jun. 6, 1997 (JP) .................................................. 9-149433

(51) Int. Cl.$^7$ ............................... G06K 9/36; G06K 9/46
(52) U.S. Cl. ............................ 382/232; 348/441; 382/304
(58) Field of Search ......................... 382/232, 248, 382/250; 348/395.1, 403.1, 408.1, 420.1, 441, 442, 446; 375/240.18, 240.2, 240.24; 358/1.16, 432, 433, 445

(56) References Cited

U.S. PATENT DOCUMENTS

| | | | | |
|---|---|---|---|---|
| 3,810,174 | * | 5/1974 | Heard et al. | 348/442 |
| 4,386,367 | * | 5/1983 | Peterson et al. | 348/446 |
| 5,339,108 | * | 8/1994 | Coleman et al. | 348/408.1 |
| 5,359,694 | * | 10/1994 | Concordel | 358/445 |
| 5,446,560 | * | 8/1995 | Schwartz | 358/445 |
| 5,694,489 | * | 12/1997 | Kishi | 382/250 |

* cited by examiner

Primary Examiner—Jon Chang
Assistant Examiner—Timothy M. Johnson
(74) Attorney, Agent, or Firm—Fitzpatrick, Cella, Harper & Scinto

(57) ABSTRACT

An image processing apparatus for converting block form image data into raster form image data by using a buffer memory. The apparatus comprises an obtainer for obtaining a number of pixels of given image data in a raster direction, wherein the given image data represents an original image. A calculator of the apparatus calculates an amount of image data temporarily stored in the buffer memory by comparing the amount of image data based on the number of pixels and a capacity of the buffer memory. A storage controller of the apparatus divides the image data based on the amount calculated by the calculator and stores the divided image data into the buffer memory. The apparatus also comprises a converter for generating raster form image data by connecting the divided image data read out from the buffer memory based on the number of pixels of the divided image data in the raster direction and the number of pixels of the original image in the raster direction.

5 Claims, 8 Drawing Sheets

IMAGE CONVERSION BETWEEN RASTER AND BLOCK FORMATS FOR COMPRESSION AND DECOMPRESSION

BACKGROUND OF THE INVENTION

1. Field of the Invention

This invention relates to converting a format of image data, for example from block data to raster data. In particular, this invention is related to converting an order of pixel data supplied in a predetermined format.

2. Description of the Related Art

A conventional compression method that utilizes a Discrete Cosine Transform (DCT), such as JPEG, has been used for compressing and decompressing digital image data. In compression, it is usually necessary to convert raster form image data into block form image data. In decompression, it is usually necessary to convert block form image data into raster form image data.

FIG. 7 explains the operation of such a conventional compression/decompression method. In FIG. 7, image capturing of extracting part 601 comprises optical lenses, image pick-up elements, signal processing circuits and so on. DRAM 602 stores image data. The image data stored in DRAM 602 is used by image display part 603, such as CRT and LCD, for displaying an image. Therefore, the image data is stored in a raster display form for image display part 603. Buffer memory 604 is used for converting raster form image data into block form image data or for converting block form image data into raster form image data. Compressor/decompressor 605 performs compression/decompression using a method such as DCT. The image data compressed by compressor/decompressor 605 is stored in storage medium 606.

When image data stored in storage medium 606 is decompressed, the compressed image data is read out from storage medium 606, supplied to compressor/decompressor 605, and expanded. The decompressed image data is output to and written into buffer memory 604.

Consider a case where a number of pixels in a horizontal direction of uncompressed image data (i.e., original image data) is H. It is necessary for buffer memory 604 to have a holding capacity for data for at least 8×H pixels, assuming that the block form data has 8 rows. During decompression, the image data is written into buffer memory 604 from compressor/decompressor 605 in units of blocks. When the image data is read out of buffer memory 604 and supplied to DRAM 602, the block form image data is converted to raster form image data. As a result, the decompressed image data shown in FIG. 8 is written into DRAM 602 and an image is displayed on image display part 603, as shown in FIG. 8.

On the other hand, when image data from image capturing part 601 is compressed, the image data is written in DRAM 602 in raster form. The image data in DRAM 602 is divided into groups of 8 rows by H pixels of image data and transferred to buffer memory 604. Thus, 8×H pixels of image data are written into buffer memory 604.

Compressor/decompressor 605 reads out the image data from buffer memory 604 in units of, for example, 8×8 pixel blocks and compresses them. In this way, the image data compressed by compressor/decompressor 605 is stored in storage medium 606.

However, according to the above conventional method, the maximum value for it is given by the following equation:

$$H = \frac{\text{the capacity of buffer memory 604}}{8(\text{rows}) \times m(\text{bits})}$$

Here, m is the number of bits which represents one pixel.

Therefore, a maximum horizontal size of an image that can be processed by compressor/decompressor 605 depends on the capacity of buffer memory 604.

SUMMARY OF THE INVENTION

An object of the invention is to address the above-mentioned shortcomings. In particular, an object of the invention is to convert raster image data into block image data or to convert block image data into raster image data using a buffer memory having a capacity which is smaller than image data for 8×H pixels, where 8 is a number of rows for blocks processed by a compression/decompression method and H is a number of pixels in a horizontal direction of an uncompressed image.

In one aspect, the present invention is an image processing apparatus which converts image data between a raster form and a block form. The apparatus comprises obtaining means for obtaining a number of pixels of given image data in a raster direction, dividing means for dividing the image data into plural process units in accordance with the number of pixels and in accordance with a capacity of a memory to which the image data is written temporarily, and transferring means for transferring the image data written in the memory to a different device in units of the process units.

Preferably, the capacity of said memory is smaller than a predetermined amount of image data determined based on the number obtained by said obtaining means.

The amount of image data is determined based on a size of a block used for compressing the image data.

The memory stores the image data of a plurality of rows.

In another aspect, the present invention is an image processing apparatus which converts block form image data into raster form image data by using buffer memory. The apparatus comprises obtaining means for obtaining a number of pixels of given image data in a raster direction, the given image data representing an original image, calculating means for calculating an amount of image data which is temporarily stored in said buffer memory by comparing an amount of image data based on the number of pixels and a capacity of said buffer memory, storage control means for dividing the image data based on the amount calculated by said calculating means and storing the divided image data into said buffer memory, and converting means for generating raster form image data by connecting the divided image data read out from said buffer memory based on the number of pixels of the divided image data in the horizontal direction and the number of pixels of the original image in the raster direction.

Preferably, the apparatus further comprises image memory for storing the converted image data, first memory means for storing the number of pixels of the original image in the raster direction, second memory means for storing a number of pixels of the divided image data in the horizontal direction, counting means for counting a number of pixels read out from said buffer memory, and control means for storing the image data of next rows read out from said buffer memory into said image memory by using the number stored in said first memory means as an offset address of said image memory when the counted pixel number coincides with the number stored in said second memory means.

This summary has been provided so that the nature of the invention may be understood quickly. A more complete understanding of the invention can be obtained by reference to the followed detailed description of the preferred embodiments thereof in connection with the attached Figures.

DETAILED DESCRIPTION OF THE PREFERRED EMBODIMENT

Figure 1:
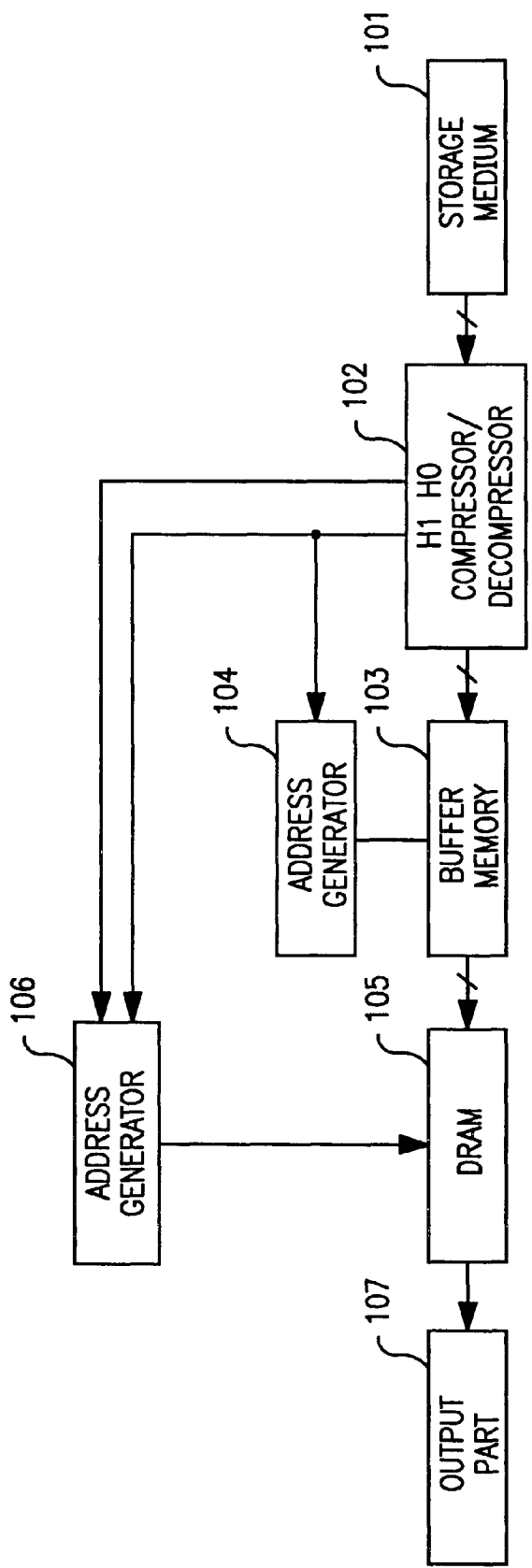
FIG. 1 shows a block diagram of a structure of an image processing circuit according to one embodiment of the present invention.

The preferred embodiment of the invention will be explained with reference to the drawing figures.

FIG. 1 shows a block diagram of a structure of an image data compression/decompression apparatus according to the preferred embodiment. In this embodiment, a number of pixels in a horizontal direction of an uncompressed image is a multiple of 8.

In FIG. 1, storage medium 101 stores image data compressed by compressor/decompressor 102. Compressor/decompressor 102 performs compression/decompression using a method such as DCT.

Buffer memory 103 temporarily stores image data for conversion from raster image data to block image data or for conversion from block image data to raster image data. Address generator 104 generates addresses for buffer memory 103 when image data is written into or read out from buffer memory 103. Compressed image data is decompressed by compressor/decompressor 102 and supplied, though buffer memory 103 in block units, to DRAM 105. Address generator 106 generates the address for DRAM 105 when image data is written into or read out from DRAM 105. DRAM 105 stores the expanded image data in raster order to be output from output part 107, which comprises a display apparatus, such as CRT and LCD, a printing apparatus, such as a laser printer and an ink jet printer, or the like. Output part 107 outputs the image data stored in DRAM 105 in raster form.

In a case where the compressed image data stored in storage medium 101 is decompressed, the compressed image data is read out from storage medium 101 and supplied to compressor/decompressor 102. Compressor/decompressor 102 analyzes the compressed image data, calculates a number of pixels H0 in the horizontal direction after decompression (i.e., the number of pixels in the horizontal direction of uncompressed original image data) and outputs the result to address generator 106. A number of pixels H1 in the horizontal direction output from buffer memory 103 to DRAM 105 in a block (i.e., the number of pixels in the horizontal direction of a block of decompressed image data stored in buffer memory 103) is supplied to address generators 104 and 106.

Compressor/decompressor 102 outputs the decompressed image data decompressed in units of MCU (Minimum Coded Unit). The decompressed image data is written into buffer memory 103 in accordance with the writing address output from address generator 104 in units of MCU.

The image data written into buffer memory 103 is read out from buffer memory 103 in accordance with the address output from address generator 104 and written into DRAM 105 in accordance with an address output from address generator 106. By virtue of this arrangement, the conversion from block image data to raster image data is performed.

A maximum number of pixels Hmax in the horizontal direction for which 8 rows of pixels can be stored in buffer memory 103 is compared with the number of pixels H0 in the horizontal direction for the image after decompression (or before compression).

Hmax is calculated based on a capacity of buffer memory 103. In a case where H0>Hmax (i.e., if image data of 8 rows×H0 pixels cannot be stored in buffer memory 103), compressor/decompressor 102 divides the image data for 8 rows into a plurality of image blocks and supplies them to buffer memory 103. Those divided image blocks are converted into original raster form image data in DRAM 105.

Here, Hmax is calculated by the following formulation:

$$H = \frac{\text{the capacity of buffer memory 103}}{8 \times (\text{the number of bits representing one pixel})}$$

The image data is divided into a plurality of image blocks as follows.

Provided that a number of pixels in the horizontal direction after decompression is H0, the image data is divided into INT (H0/Hmax) blocks of 8 (rows)×Hmax (pixels) and one block of 8 (rows)×(H0 mod Hmax) (pixels). Here, INT (H0/Hmax) is the largest integer which is equal to or less than H0/Hmax. (H0 mod Hmax) is the remainder of H0/Hmax.

Address generator 106 recognizes that H0 and H1 output from compressor/decompressor 102 are defined above.

Figure 2:
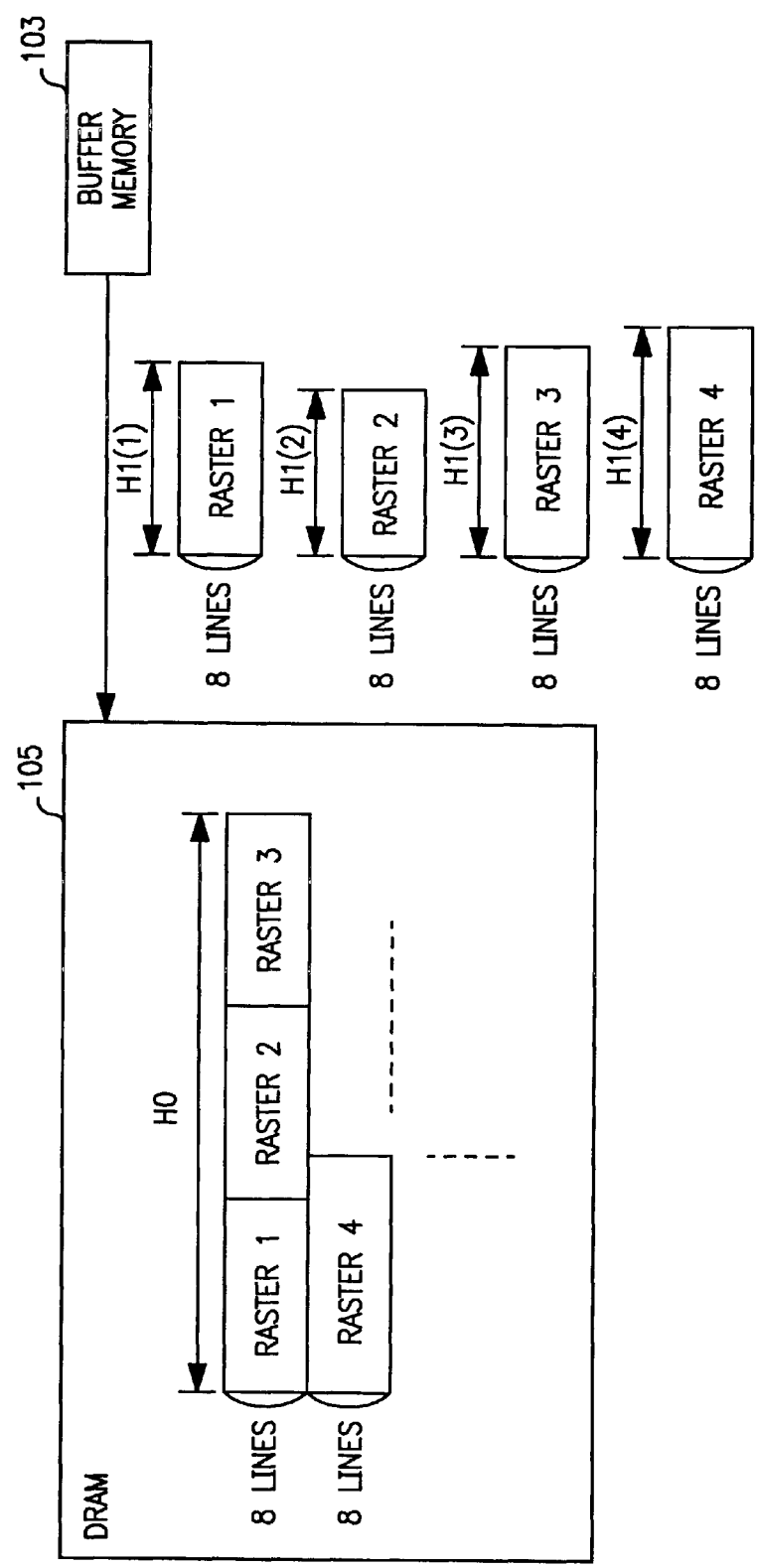
FIG. 2 is a diagram for explaining the development of raster data from buffer memory 103 to DRAM 105 in an image processing circuit according to one embodiment of the present invention.

FIG. 2 is a diagram for explaining transmission of block images from buffer memory 103 to DRAM 105. The figure shows an example in which the capacity of buffer memory 103 (Hmax) is less than the data amount of 8 (rows)×H0 (pixels) of the original image. Each of image blocks H1(1) through H1(4) expresses corresponding raster data written in buffer memory 103.

In FIG. 2, the image blocks read out from buffer memory 103 are divided into H1(1) (raster 1), H1(2) (raster 2), H1(3) (raster 3) and H1(4) (raster 4). With raster 1 through raster 3, an image corresponding to H0 pixels of the image data in the horizontal direction can be obtained.

Here, address generator 104 sequentially reads out image blocks from buffer memory 103 until the following equation becomes true.

H0=H1(1)+H1(2)+ . . . +H1(N)

Address generator 106 outputs addresses to write the image blocks, which preferably comprise 8 lines and are read out from buffer memory 103, into DRAM 105 successively in the horizontal direction.

Figure 3:
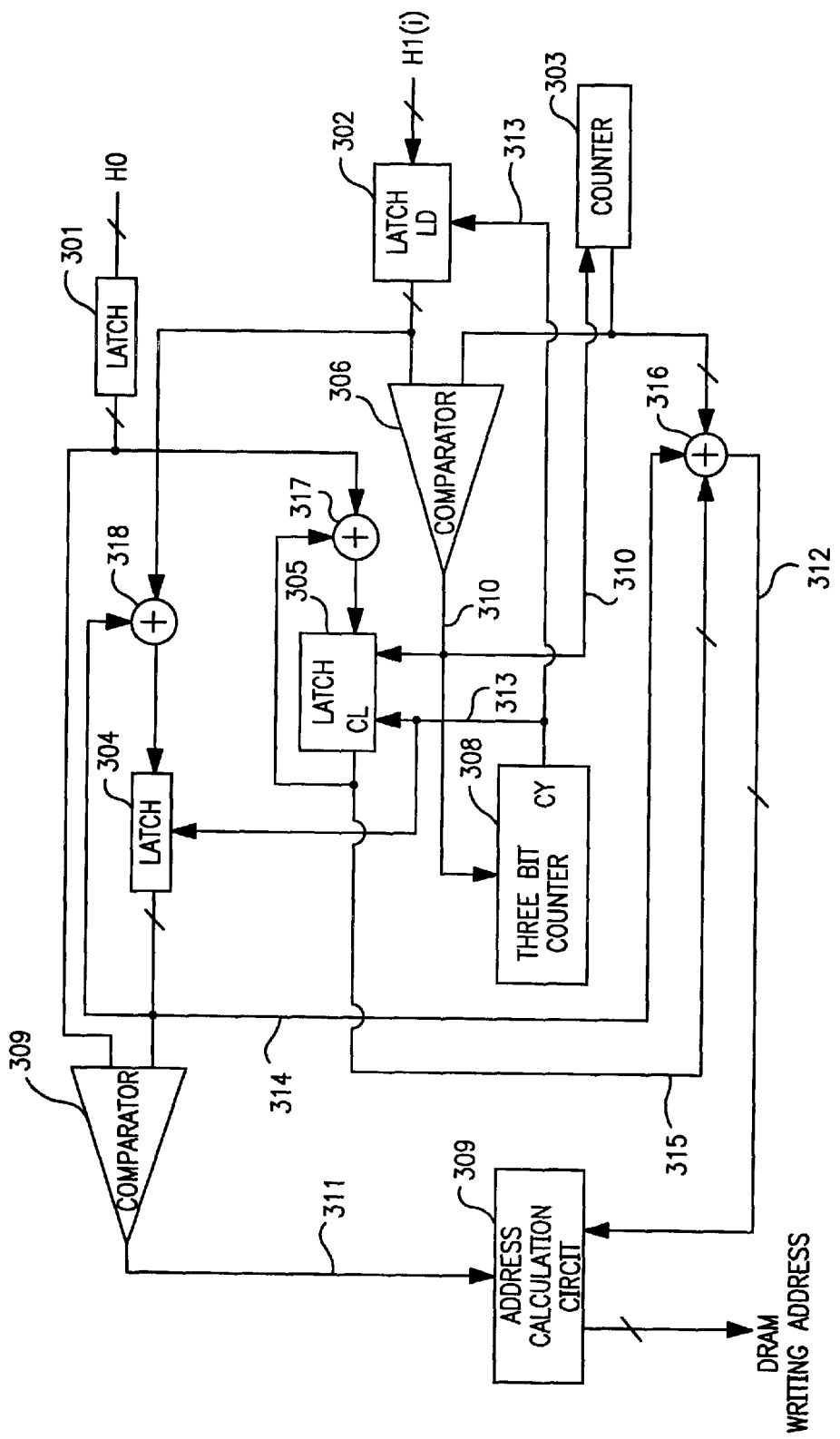
FIG. 3 shows a block diagram of a structure of an address generator according to one embodiment of the present invention.

FIG. 3 shows a block diagram of a structure of address generator 106 according to this embodiment.

In FIG. 3, latch 301 holds a number H0 of pixels in the horizontal direction of the image data output from compressor/decompressor 102 for the entire image (i.e., the number of pixels in the horizontal direction of uncompressed original image data). Latch 302 holds the number H1 of pixels in the horizontal direction for each image block output from compressor/decompressor 102 (i.e., the number of pixels in the horizontal direction of a block of decompressed image data stored in buffer memory 103). Counter 303 is incremented, from initial value "0", each time when each pixel data (8 bits) is transmitted to DRAM 105. Comparator 306 compares the output value of counter 303 (the number of pixels sent to DRAM 105) and the output value of latch 302 (the number of pixels of the image block in the horizontal direction).

In a case where the output value of latch 302 equals the output value of counter 303, comparator 306 outputs signal 310 at a high level. Each time signal 310 becomes a high level, 3-bit counter 308 is incremented. Thus, 3-bit counter 308 counts the transmission of a row of block of image data, producing carry output signal 313 every 8 rows. When signal 313 becomes a high level, latch 304 latches an output of adder 318, providing an offset address for storing image blocks to DRAM 105.

When 3-bit counter 308 counts 8, the output of adder 318 is latched at latch 304, latch 305 is cleared and the number H1(2) of pixels of a next image block in the horizontal direction is set at latch 302.

In this way, latch 304 holds an accumulated value of a number of pixels of the image blocks in the horizontal direction (H1(i)).

Latch 305 provides an offset address value of a starting address for each line in each image block. For example, after image data for a row of pixels of block H1(1) is written into DRAM 105, latch 305 provides an address for succeeding rows of image data lines by using integral multiples of H0 as will be explained in detail with reference to FIG. 4.

Comparator 307 is used for judging whether a sum of a number of pixels of each image block in the horizontal direction stored in latch 304 coincides with H0.

Adder 316 is used for calculating an address for storing pixel data of each line in each image block in DRAM 105. Adder 316 adds the counted value of counter 303, the starting address of each image block from latch 304 and the offset address in accordance with the line number from latch 305.

Address calculator 309 receives output 312 of adder 316 and output 311 of comparator 307 and generates writing addresses for DRAM 105.

Figure 4:
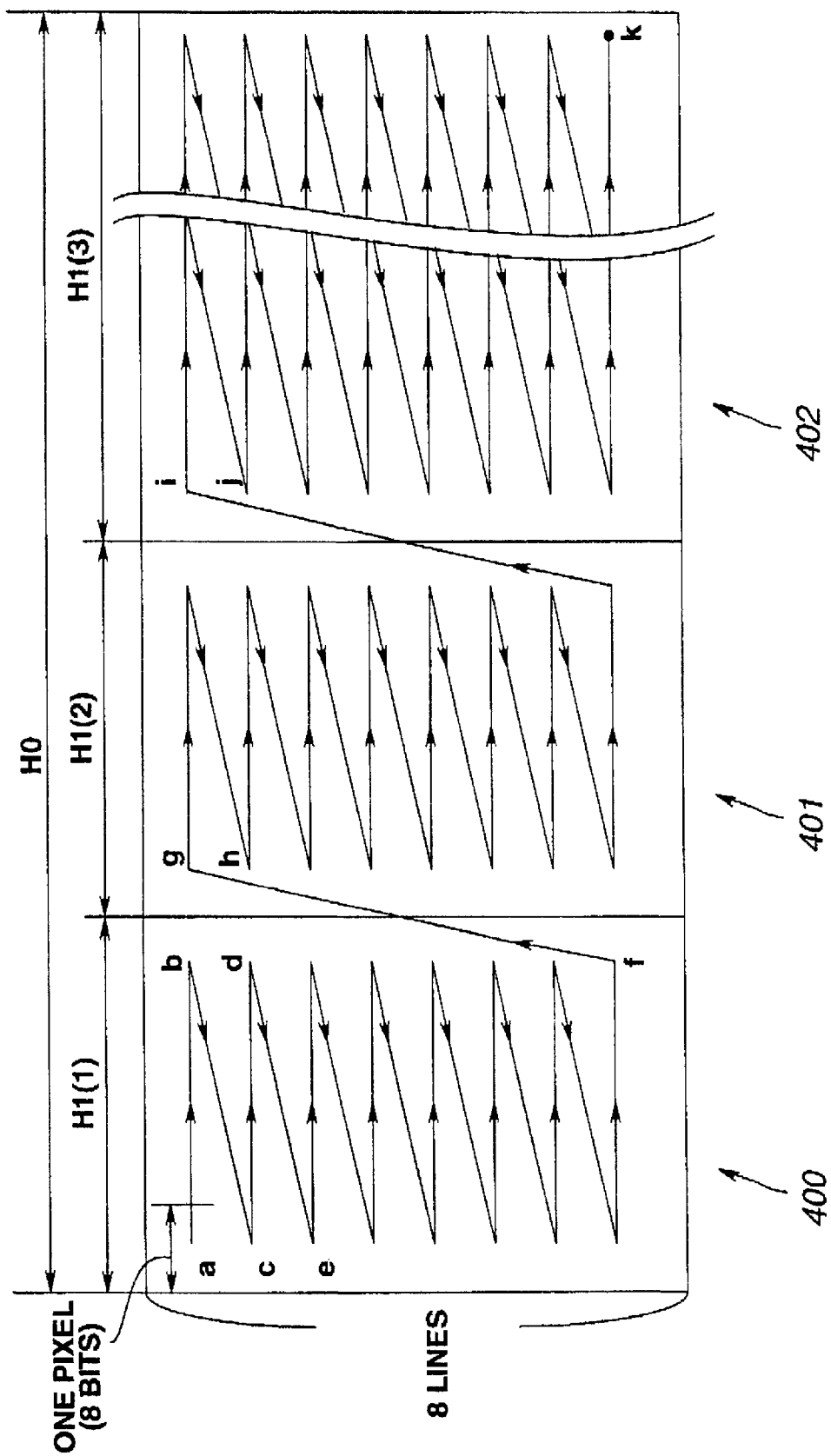
FIG. 4 is a diagram for explaining a change of writing addresses for DRAM 105, which are generated by an address generator, according to one embodiment of the present invention.

FIG. 4 is a diagram for explaining output of addresses by address generator 106.

First, when the number H1(1) of pixels of block 400 in the horizontal direction is supplied, the number H1(1) is latched at latch 302, and latch 304, latch 305, and counter 303 are reset to 0.

In this state, each time one pixel data (8 bits) of an image block is sent to DRAM 105, counter 303 is incremented (+1). According to the value output from counter 303, the pixel data is stored starting at address "a" in DRAM 105 in order.

In this way, when the number of pixels in the horizontal direction stored in DRAM 105 becomes equal to H1(1) (address "b"), the output signal 310 of comparator 306 goes to a high level. After that, H0 is set at latch 305, 3-bit counter 308 is incremented (+1), and counter 303 is reset to "0". As a result, an output value of adder 316 becomes H0. A next pixel data is stored at address H0 (the starting address of the second line, address "c").

When all pixel data of the second line in image block 400 is written in DRAM 105, output signal 310 of comparator 306 goes to a high level again (at address "d"). After that, the added value 2×H0 is stored at latch 305, 3-bit counter 308 is incremented (+1), and counter 303 is reset. As a result, the output value of adder 316 becomes 2×H0. Next pixel data is stored at address "e".

In this way, after all pixel data for 8 rows in image block 400 is sent to DRAM 105 and addresses of DRAM 105 from "a" to "f" are filled, carry output signal 313 of 3-bit counter 308 becomes a high level. As a result, H1(1) is latched at latch 304. After that, the number H1(2) of pixels of image block 401 in the horizontal direction is set at latch 302, and latch 305 and counter 303 are cleared. Thereafter, the output of adder 316 represents H1(1).

Pixel data of image block 401 is stored in DRAM 105 starting at address H1(1) (corresponding to address "g"). In the same way as image block 400, when pixel data which corresponds to pixel number H1(2) of pixels in the horizontal direction is stored in DRAM 105, H0 is latched at latch 305, and the pixel data of the second line in image block 401 is stored starting at address H0+H1(1) (corresponding to address "h").

In the same way, after all 8-rows of data in image block 401 are stored in DRAM 105, H1(1)+H1(2) is latched at latch 304. After that, latch 305 and counter 303 are cleared and the number H1(3) of pixels of image block 402 in the horizontal direction is set. As a result, the output of adder 316 represents H1(1)+H1(2).

Pixel data in image block 402 is stored in DRAM 105 from address H1(1)+H1(2) (corresponding to address "i"). In the same way as image block 401, when the pixel data which corresponds to the number H1(3) of pixels in the horizontal direction is stored in DRAM 105, H0 is latched at latch 305, and the pixel data of the second line in image block 401 is stored from address H0+H1(1)+H1(2) (corresponding to address "j").

In the same way, when all 8 rows of data in image block 402 are stored in DRAM 105 (the last address is address "k"), the value H1(1)+H1(2)+H1(3) latched at latch 304 becomes equal to H0. After that, signal 311 is output from comparator 307.

As a result, address calculation circuit 309 advances "8×H0" for the address for storing data in DRAM 105. After that, address calculation circuit 304 generates a writing address of DRAM 105 by adding 8×H0 to the address output from adder 316, and address generator 106 repeats the above operations.

The above processing is repeated until all image data is stored in DRAM 105.

Figure 5:
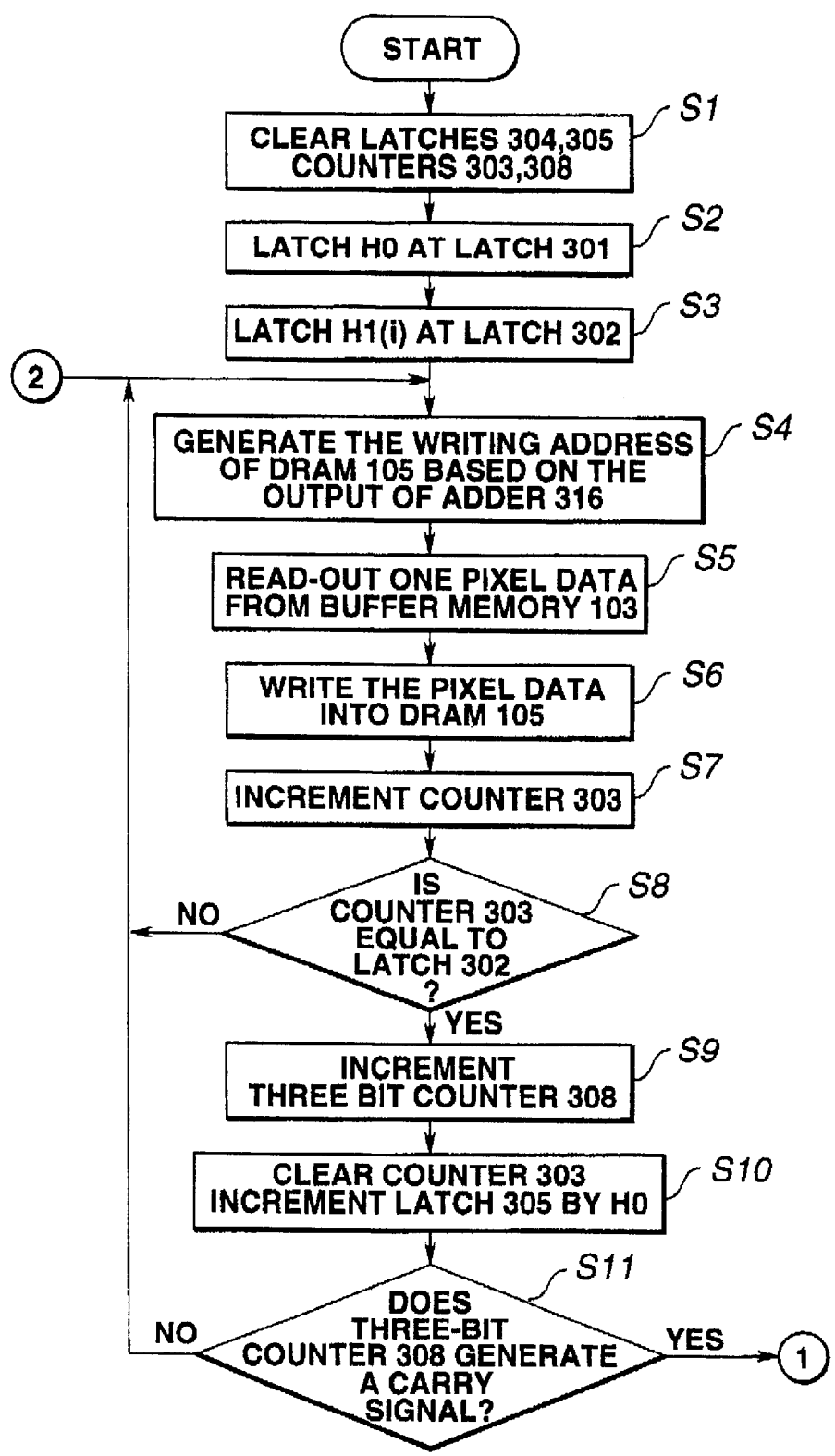
FIG. 5 and FIG. 6 are flow-charts for explaining the operation of an address generator, according to one embodiment of the present invention.
Figure 6:
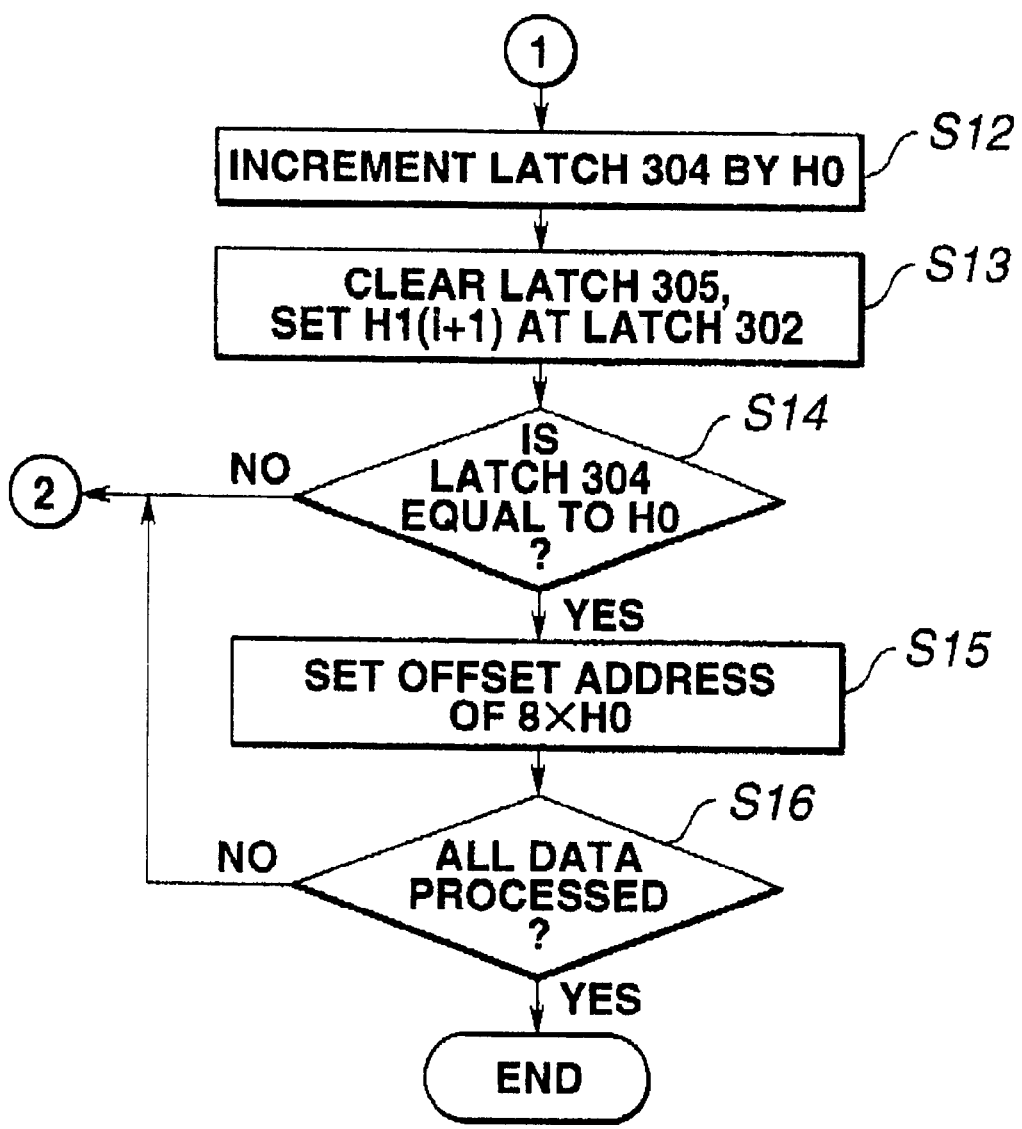
Figure 7:
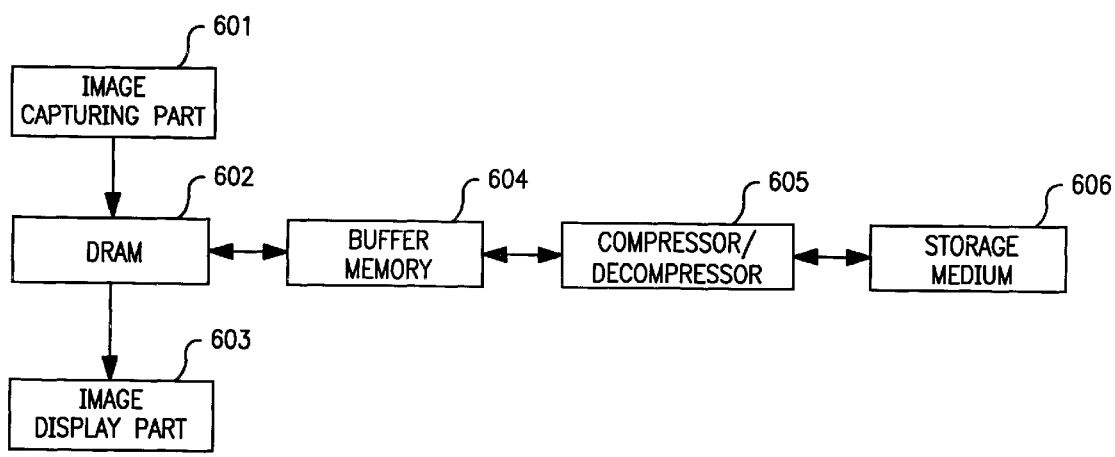
FIG. 7 shows a block diagram of a structure of a conventional image processing circuit.
Figure 8:
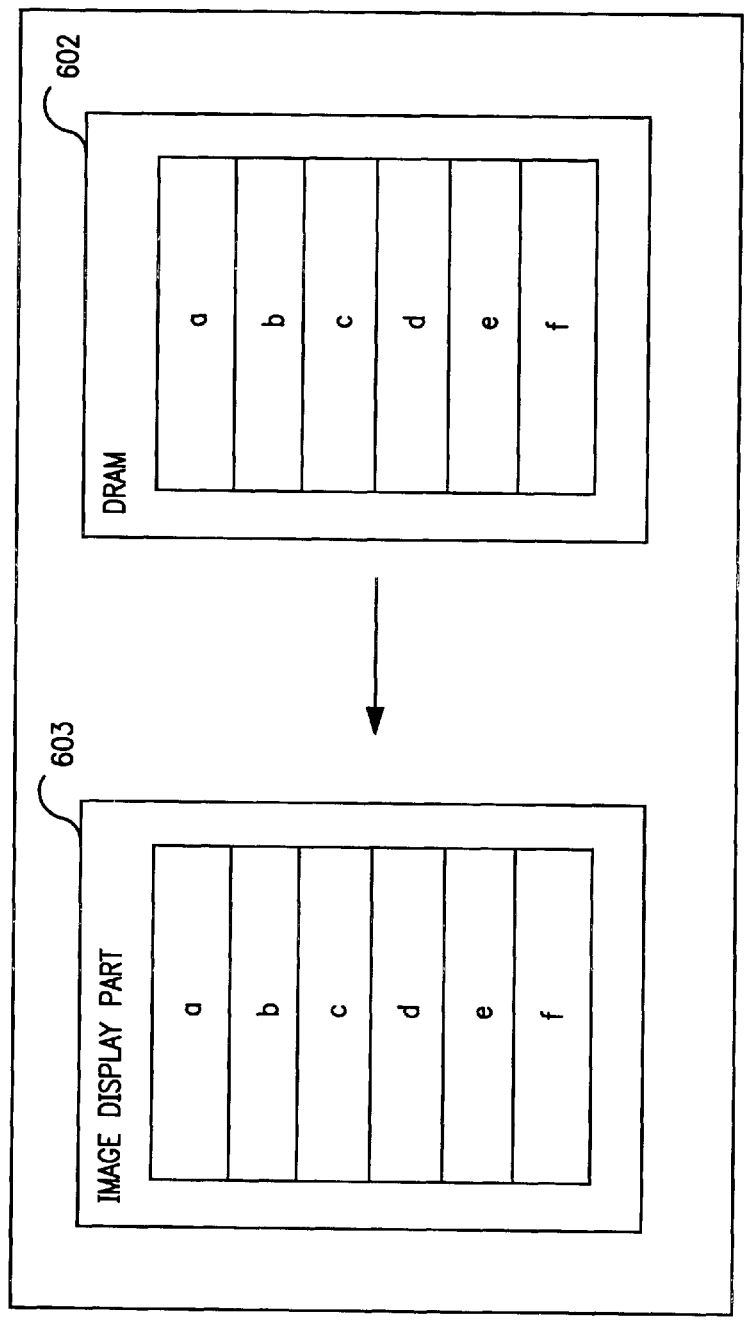
FIG. 8 is a diagram for explaining a relation between image data stored in a DRAM and display of the image data.

FIGS. 5 and 6 are flow-charts for explaining address generation by address generator 106 and storage of image data to DRAM 105 based on the address generation.

In step S1, latches 304 and 305 and counters 303 and 308 are cleared. In step S2 the number H0 of pixels of the image data in the horizontal direction is latched at latch 301. In step S3, the number H1(i) (i=1) pixels of the beginning image block in the horizontal direction is latched at latch 302.

Next, in step S4, in order to generate a writing address for DRAM 105, an offset address is added to the address output from adder 316 at address calculation circuit 309.

In step S5 one pixel data in the image block is read out from buffer memory 103. In step S6, the pixel data is written into the address calculated in step S4. In step S7, counter 303 is incremented (+1).

In step S8, it is determined whether the value of counter 303 has become equal to the value of latch 302. That is, it is determined if all the pixels in the block in the horizontal direction has been transmitted to and stored in DRAM 105.

If a result of the determination is negative, flow returns to step S4, and the next storage address of DRAM 105 is calculated and the image data read out from buffer memory 103 is stored in DRAM 105.

In this way, after storage of pixels corresponding to the number of pixels of the image block in the horizontal direction, the process goes to step S9. In step S9, 3-bit counter 308 is incremented (+1). In step S10, counter 303 is cleared. H0 is added to the stored value of latch 305, and a result of the addition is stored back in latch 305.

In step S11, it is judged whether the value in 3-bit counter 308 has become 8. If 3-bit counter 308 has not reached 8, the process returns to step S4 and the above operation is repeated.

When 3-bit counter 308 becomes 8 in step S11, writing of pixel data for 8 rows of the image block is finished. After that, flow proceeds to step S12. In step S12, H0 is added to the value of latch 304, and a result of the addition is stored back in latch 304. In step S13, latch 305 and counter 303 are cleared. In step S13, the number H1(i) (i=2) of pixels of a next image block in the horizontal direction is set at latch 302.

After that, the process goes to step S14. In step S14, it is determined whether the value of latch 304 has become equal to H0. That is, as for the example of FIG. 4, it is determined whether the storage of the last pixel data of the eighth line in image block 402 is finished or not.

If a result of the determination is negative, flow returns to step S4 and the above processing is performed. If the result is positive, flow goes to step S15.

In step S15, an offset address of 8 (rows)×H0 is calculated. If it is judged that all the image data is not processed, flow returns to step S4 and DRAM 105 starts storing the pixel data from the image block having H1(4) pixels in the horizontal direction, by setting an offset address of 8×H0. The process is repeated from step S4 though step S15 until it is judged in step S16 that all the image data is processed.

According to the above operation, 8 rows of image data, which is divided into image blocks by compressor/decompressor 102, is stored in DRAM 105 so that the blocks are combined and the original raster form of the image data is restructured.

In the structure of the embodiment shown in FIG. 1, the output of compressor/decompressor 102 is stored in buffer memory 103 only once, and after that it is written in DRAM 105. The reason for this is as follows.

Generally, DRAM with large memory capacity can be produced at a relatively low cost. However, DRAM has a low read/write speed when image data is read out from/ written into it. In order to accelerate the read/write speed, DRAM in this embodiment is structured so that it can read/write data, once the address which should be accessed is set, by automatically incrementing the address without setting the address for a predetermined number of pixels.

However, even if the read/write speed is accelerated in the above way, sometimes the speed is slower than the output speed of image data from compressor/decompressor 102.

Especially, as shown in FIG. 2, the addresses of the 8 rows of image data of a block are discontinuous. As a result, the address setting frequency of DRAM increases. Therefore, previously, it was difficult to write the image data from compressor/decompressor 102 into DRAM directly in synchronism with the process speed of compressor/ decompressor 102.

According to the structure shown in FIG. 1, a buffer memory which comprises a memory having a higher access speed than DRAM, such as SRAM, is inserted between DRAM and compressor/decompressor so that the 8 rows of image data can be written into DRAM with continuous addresses.

According to the structure, it is possible to write the image data output from high speed compressor/decompressor into low cost DRAM.

As a result, it is possible to obtain the original raster image data by reading out, from buffer memory 103, the image blocks which have various number of pixels in horizontal direction.

According to the above embodiment, it is possible to convert raster image data to block image data or convert block image data to raster image data by using a buffer memory with a capacity smaller than image data for one raster. Therefore, it is possible to compress/decompress image data, which has an unlimited pixel number in the horizontal direction, independent of the capacity of the buffer memory.

In the above embodiment, image data decompression is explained. However, the similar method can be applied for converting raster image data into block image data in compression.

In the above embodiment, the image data of 8 rows are divided into one or more image blocks with Hmax pixels in the horizontal direction and one image block with (H mod Hmax) pixels in the horizontal direction. Alternatively, it is possible to divide the image data into N image blocks each with a number of pixels in the horizontal direction that is almost equal and not more than Hmax.

In the above embodiment, the image blocks have 8 rows. However, the number of rows is not limited to eight and may be changed in accordance with a particular compression/ decompression algorithm.

Modifications of the above embodiments are included in the scope of this invention.

The present invention can be applied not only to a system comprising a plurality of devices (for example, a host computer, an interface apparatus, a reader, a printer and so on), but also to a single device (for example, a copying machine, a facsimile machine and so on).

The present invention can be achieved by providing stored software program codes i.e., computer executed process steps for realizing the above-described operation with a computer in the apparatus or the system connected to any of various device (e.g., a printer), and making the computer (e.g., CPU or MPU) in the apparatus or the system operate in accordance with the stored program.

In this case, the program codes of said software themselves are used to realize the above-described operation of the embodiment. The program codes themselves and means for supplying them to the computer, for example, the memory medium storing the program codes, comprise the invention.

For example, floppy disks, hard disks, optical disks, opto-magnetic disks, CD-ROM, CD-R, magnetic tapes, non-volatile memory cards, EPROMS, ROMS can be used as the memory medium storing the program codes.

Needless to say, the above mentioned function of the embodiment can be realized not only by the computer which executes the supplied program codes but also by the computer which executes the supplied program codes together with the OS (operating system) operating the computer or other application software.

Further, the supplied program codes can be stored in the memory provided in a function extension board or a function extension unit connected to the computer. The CPU and so on mounted on the function extension board or the function extension unit may execute a part of or all of the processing based on the instruction of the program codes.

While present invention is described above with respect to what is currently considered to be its preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image processing apparatus which converts block form image data into raster form image data by using buffer memory, comprising:

obtaining means for obtaining a number of pixels of given image data in a raster direction, the given image data representing an original image;

calculating means for calculating an amount of image data which is temporarily stored in said buffer memory by comparing the amount of image data based on the number of pixels and a capacity of said buffer memory;

storage control means for dividing the image data based on the amount calculated by said calculating means and storing the divided image data into said buffer memory; and converting means for generating raster form image data by connecting the divided image data read out from said buffer memory based on the number of pixels of the divided image data in the raster direction and the number of pixels of the original image in the raster direction.

2. An apparatus according to claim 1, wherein the capacity of said buffer memory is smaller than a predetermined amount of image data determined based on the number obtained by said obtaining means.

3. An apparatus according to claim 2, wherein said amount of image data is determined based on a size of a block used for compressing the image data.

4. An apparatus according to claim 1, wherein said buffer memory stores the image data of a plurality of rows.

5. An apparatus according to claim 1, wherein said converting means further comprises:

image memory for storing the converted image data;

first memory means for storing the number of pixels of the original image in the raster direction;

second memory means for storing the number of pixels of the divided image data in the raster direction;

counting means for counting a number of pixels read out from said buffer memory; and control means for storing the image data of next rows read out from said buffer memory into said image memory by using the number stored in said first memory means as an offset address of said image memory when the counted number coincides with the pixel number stored in said second memory means.

* * * * *